March 8, 1966 V. R. BEERY 3,239,401
METHOD OF BONDING ELECTRIC HEATING WIRE BETWEEN
LAYERS OF THERMOPLASTIC MESH
Original Filed Feb. 20, 1961
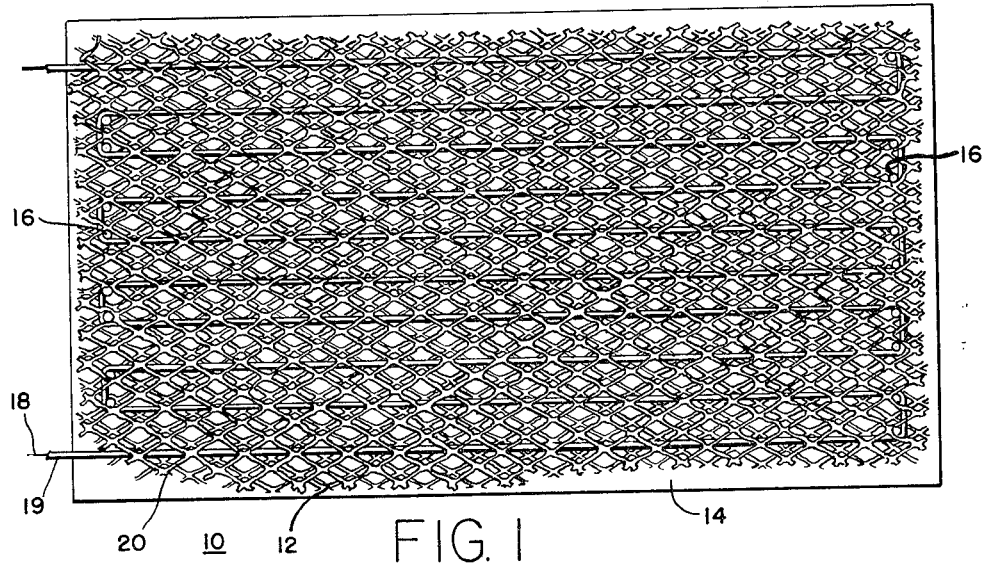
FIG. 1
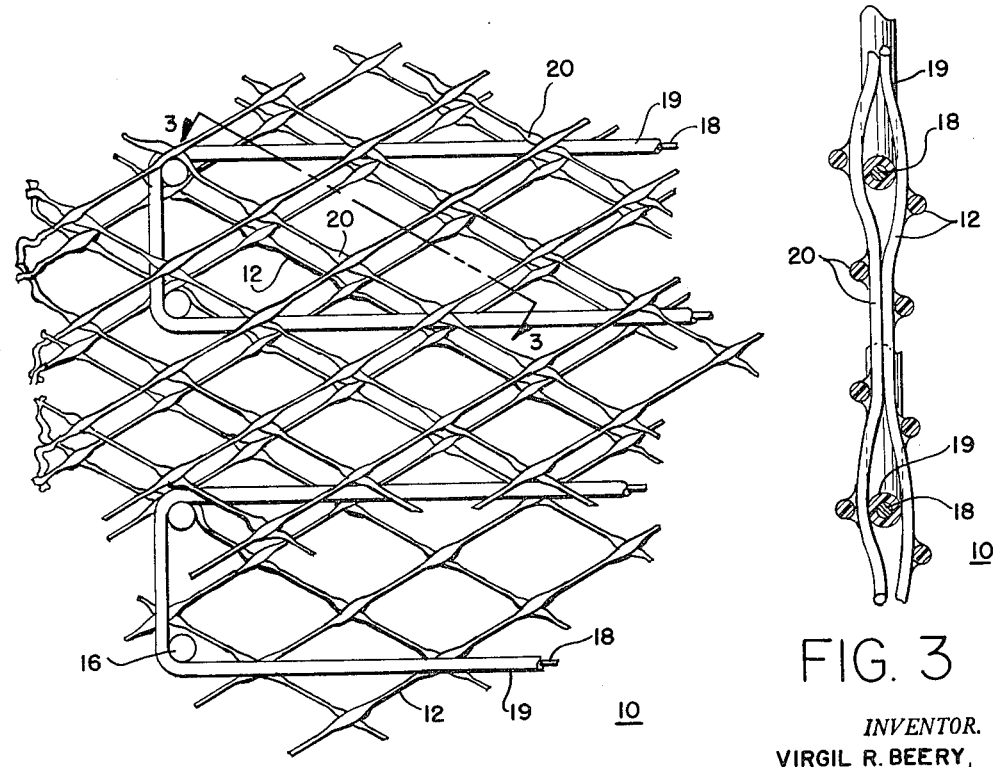
FIG. 2
FIG. 3
INVENTOR.
VIRGIL R. BEERY,
BY: Mason, Kolehmainen,
Rathburn & Wyss;
ATTORNEYS.

United States Patent Office 3,239,401
Patented Mar. 8, 1966

3,239,401
METHOD OF BONDING ELECTRIC HEATING WIRE BETWEEN LAYERS OF THERMOPLASTIC MESH
Virgil R. Beery, 538 N. Park St., Centerville, Iowa
Original application Feb. 20, 1961, Ser. No. 90,354. Divided and this application Dec. 18, 1964, Ser. No. 425,102
9 Claims. (Cl. 156—179)

This invention relates to an electric heating mat and to the method of making the same and, more particularly, it relates to electric heating mats of the type adapted for use in concrete slabs or the like. This application is a division of copending application Serial No. 90,354, filed Feb. 20, 1961.

In many installations of concrete slabs such as driveways, sidewalks, building floors and roofs or the like, it is desirable to have embedded in the concrete slab an electric heating mat in order to melt snow and ice accumulating on the slab or to keep the temperature of the slab at a desirable level. These heating mats can also be placed in the ground beneath flower beds and in hot houses to provide ground warmth for plants.

One means of producing electric mats for this type use is weaving an electric resistive heating element through the opening in a wire mesh, such as chicken wire or the like, and then laying the mat into the concrete when it is poured.

This type of mat is subject to several disadvantages, one of which is that introducing the electric wire through the openings in a chicken wire or mesh is a difficult and costly operation, and if the electric wire is sandwiched between two layers of chicken wire or mesh, as is sometimes done, the two outer layers must be fastened together in some way to form an integral mat. Another disadvantage is that during the weaving, sandwiching or fastening operation, the insulation on the electric wire may become injured and the electric wire shorted to the chicken wire or mesh, making the mat unusable. Also, shorting of the electric heating wire to the chicken wire or mesh may be inadvertently or accidentally done when the mats are stored, handled or installed.

Further disadvantages are found when these heating mats are used in that current flowing through the electric resistance wires causes inductive currents to flow in the chicken wire or mesh and, hence, the chicken wire or mesh must be grounded with the result that more electric power is required to produce a given amount of heat.

Therefore, it is an object of the present invention to produce an electric heating mat which is simple in construction, low cost, and one which does not employ a metallic conducting mesh to support the heating wires.

Another object of the present invention is to provide an electric heating mat in which the electric heating wire is supported by a flexible mesh composed of insulating material, such as plastic or the like, with the result that the possibility of the electric heating wire shorting is greatly reduced and there is no necessity for electrically grounding the supporting mesh.

The foregoing and other objects of the present invention are accomplished by providing an electrical heating mat in which an electric heating wire is placed in a desirable pattern on a mesh composed of a flexible insulating material, such as thermoplastic or the like, and then another layer of the insulating mesh is placed on top of the electric heating wire. The composite of the two layers of insulating mesh with the pattern of electric heating wire sandwiched in between is then placed in an oven and heated. During the heating operation, the upper layer and lower layer of the insulating thermoplastic mesh are fused together and the electric heating wire is thus secured integrally with the fused meshes. No pressure is required to fuse the upper layer with the lower layer of the plastic mesh as the weight of the upper layer is sufficient.

Many other objects and advantages of the present invention will become apparent from the following description in conjunction with the drawing in which:

FIG. 1 is a top view of a work area on which an electric heating mat embodying the present invention is being constructed;

FIG. 2 is an enlarged detailed view of the mat of FIG. 1; and

FIG. 3 is a section view of the mat of FIG. 1 taken along line 3—3 of FIG. 2, but illustrated after heat fusing of the meshes.

In constructing an electric heating mat 10 as characterized by the features of the present invention, a first layer of an insulating flexible thermoplastic mesh 12 is placed upon the work surface 14. The work surface 14 can be of any size desired, but it has been found that a four foot width by twenty foot length is sufficient for most size requirements of the mat 10. The mesh 12 is preferably of diagonal configuration and the spacing and size of the strands of the mesh 12 can be varied according to the flexibility, strength and application desired.

Pegs 16 are placed in suitably spaced holes provided in the work surface 14 and then an electric resistance heating wire 18 is positioned on the mesh 12 and spaced around the pegs 16 to form parallel lengths, as shown in FIG. 1. As here illustrated, the heating wire 18 is enclosed in an insulating cover 19 formed of suitable heat-resistant, electrical insulating material. The wire 18 can be any suitable resistive heating material, such as a nichrome wire, and the size of he wire and spacing can be adjusted to suit the given application for the mat 10.

After completing the positioning of the insulating heating wire 18 on the mesh 12 around the spaced pegs 16, a second layer of insulating thermoplastic mesh 20 is placed on top of the heating wire 18 and mesh 12. The mesh 20 is the same type as mesh 12, and the placement of mesh 20 does not have to be accurately lined up with the voids of mesh 12, but can be more or less at random. The mat 10 is then placed in a heating oven. The heat of the oven and the weight of mesh 20 without other externally applied pressure is sufficient to cause strands of the thermoplastic meshes 12 and 20 to contact and become fused with each other, thus forming an integral mat with the pattern of heating wire 18 secured loosely between the meshes 12 and 20. The pegs 16 may be removed from the work surface 14 either before or after the heating of the mat. The completed mat 10 is then ready for installation in a concrete drive, sidewalk, building roof or floor, hot houses, flower beds, or the like. After installation the ends of the heating wire 18 are connected to an electrical power source and the concrete slab or the like is thus electrically heated to the desired temperature.

The size, resistance, spacing and length of the heating wire 18 can be varied during construction of the heating mats 10 so that the mats can be connected in series or parallel to match the desired voltage source to provide the proper amount of heat desired for any given application. The two layers of flexible plastic mesh 12 and 20 hold the electric heating wire 18 sufficiently in place so that the heating of the slab is substantially uniform and there is no metallic mesh to which the heating wire 18 could become easily shorted during pouring of the concrete.

The method of constructing the mats is simple and economical and the finished mat is light and easy to handle.

Although the present invention has been described with reference to the illustrated embodiment, it should be understood that many other modifications and embodiments can be devised by those skilled in the art that will fall within the spirit and scope of the principles of this invention.

What is claimed as new and desired to be secured by Letters Patent of the United States is:

1. The method of forming an electric heating mat comprising the steps of positioning a first layer of flexible thermoplastic mesh on a work means, positioning an electric resistive heating wire on said layer, positioning a second layer of flexible thermoplastic mesh over said heating wire and said first layer, and applying heat to said layers to fuse said layers together.

2. The method as set forth in claim 1 above wherein said step of positioning said heating wire on said layer includes the step of spacing said heating wire around a plurality of spacing means to effect a desired spacing of said heating wire.

3. The method set forth in claim 1 above wherein the weight of said second layer alone brings said second layer into fusing engagement with said first layer during the application of heat thereto.

4. A method of making an electric heating mat comprising the steps of positioning an electric heating wire on a first layer of thermoplastic mesh, positioning a second layer of thermoplastic mesh over said electric heating wire and heating the structure to fuse said layers together.

5. A method of making an electric heating mat comprising the steps of sandwiching an electric heating wire between two layers of thermoplastic mesh and heating said structure to fuse said layers together.

6. A method of making an electric heating mat comprising the steps of laying a pattern of electric heating wire on a first layer of thermoplastic mesh having spaced strands, placing a second layer of thermoplastic mesh over said heating wire with strands of said second layer crossing over strands of said first layer in a random fashion and joining together random crossing strands of said layers by fusion.

7. A method of making an electric heating mat comprising the steps of laying a pattern of electric heating wire on a first layer of thermoplastic mesh having spaced strands, said pattern forming a number of parallel runs from a continuous length of said wire, said runs crossing over said strands of said first layer, placing a second layer of thermoplastic mesh on said pattern in random fashion wherein strands of said second layer cross over said runs of wire and said strands of said first layer, and fusing together said strands of said layers.

8. A method of making an electric heating mat comprising the steps of laying a pattern of electric heating wire from a continuous length thereof on a first layer of thermoplastic mesh having diagonal, spaced strands, said pattern including a plurality of parallel runs extending angularly across said diagonal strands, placing a second layer of thermoplastic mesh over said pattern in a random fashion whereby diagonal, spaced strands thereof cross over strands of said first layer and extend angularly across said runs, and fusing together said strands of said layers to hold said pattern therebetween.

9. A method of making an electric heating mat comprising the steps of laying an insulated heating wire in a pattern having extended parallel runs over, and in intimate contact with, at least one layer of flexible thermoplastic mesh having spaced strands of insulating material defining enlarged open spaces therebetween to form a partially assembled unit, and applying heat to said unit to complete the assembly thereof.

References Cited by the Examiner

UNITED STATES PATENTS

| | | | |
|---|---|---|---|
| 2,825,168 | 3/1958 | Ekman | 161—92 XR |
| 3,047,860 | 7/1962 | Swallow et al. | 161—89 XR |
| 3,050,749 | 8/1962 | Crane et al. | 5—347 |

EARL M. BERGERT, *Primary Examiner.*